United States Patent [19]

Weaver et al.

[11] Patent Number: 4,528,368

[45] Date of Patent: Jul. 9, 1985

[54] AZO DYES FROM 2-AMINO-5-CYANOMETHYLTHIO-1,3,4-THIADIAZOLE AND ANILINE AND TETRAHYDROQUINOLINE COUPLERS

[75] Inventors: Max A. Weaver; Clarence A. Coates, Jr., both of Kingsport, Tenn.

[73] Assignee: Eastman Kodak Company, Rochester, N.Y.

[21] Appl. No.: 606,490

[22] Filed: May 3, 1984

Related U.S. Application Data

[63] Continuation-in-part of Ser. No. 531,188, Sep. 12, 1983, abandoned, which is a continuation of Ser. No. 315,107, Oct. 26, 1981, abandoned.

[51] Int. Cl.$^3$ .................. C09B 29/048; C09B 29/09; C09B 29/44; D06P 1/18
[52] U.S. Cl. .................. 534/768; 534/775; 534/777; 534/795; 548/130
[58] Field of Search .................. 260/152, 155, 158; 534/768, 775, 777, 795

[56] References Cited

U.S. PATENT DOCUMENTS

| | | | |
|---|---|---|---|
| 3,493,556 | 2/1970 | Weaver et al. | 260/158 |
| 3,631,020 | 12/1971 | Weaver et al. | 260/158 |
| 3,639,384 | 2/1972 | Weaver et al. | 260/158 X |
| 3,639,385 | 2/1972 | Weaver et al. | 260/158 |
| 3,657,215 | 4/1972 | Weaver et al. | 260/158 |
| 3,660,374 | 5/1972 | Weaver et al. | 260/158 X |
| 3,673,169 | 6/1972 | Weaver et al. | 260/158 |
| 3,762,861 | 10/1973 | Weaver et al. | 260/158 |
| 4,302,390 | 11/1981 | Giles et al. | 260/158 |

*Primary Examiner*—Floyd D. Higel
*Attorney, Agent, or Firm*—Donald W. Spurrell; J. Frederick Thomsen

[57] ABSTRACT

This invention relates to new azo dyes derived from 2-amino-5-cyanomethylthio-1,3,4-thiadiazole and aniline and tetrahydroquinoline couplers which may be extensively substituted. The dyes impart orange to violet shades on hydrophobic fibers, including polyesters, polyamides, and cellulose esters. They are of the particular interest for dyeing textured polyester fibers and have excellent properties such as fastness to light and sublimation.

10 Claims, No Drawings

AZO DYES FROM 2-AMINO-5-CYANOMETHYLTHIO-1,3,4-THIADIAZOLE AND ANILINE AND TETRAHYDROQUINOLINE COUPLERS

This is a continuation-in-part application of Ser. No. 531,188, filed Sept. 12, 1983, now abandoned, which is a continuation of Ser. No. 315,107, filed Oct. 26, 1981, now abandoned.

This invention relates to new azo dyes derived from 2-amino-5-cyanomethylthio-1,3,4-thiadiazole and aniline and tetrahydroquinoline couplers which may be extensively substituted. The dyes impart orange to violet shades on hydrophobic fibers, including polyesters, polyamides, and cellulose esters. They are of the particular interest for dyeing textured polyester fibers and have excellent properties such as fastness to light and sublimation.

The dyes of this invention have the formula:

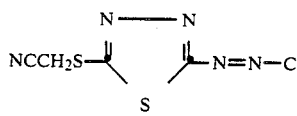

wherein C is the residue of an aniline or tetrahydroquinoline coupling component of the formulae

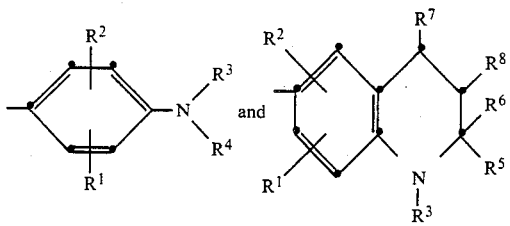

wherein $R^1$ and $R^2$ are each selected from hydrogen, fluorine, chlorine, bromine, alkyl, cycloalkyl, alkoxy, phenoxy, alkylthio, arylthio, and radicals having the formula $-NH-X-R^9$ in which X is $-CO-$, $-COO-$, or $-SO_2-$, and $R^9$ is selected from alkyl, aryl, cycloalkyl and alkyl substituted with halogen, hydroxy, phenoxy, aryl, cyano, cycloalkyl, alkylsulfonyl, alkylthio, alkanoyloxy, and alkoxy, and when X is $-CO-$, $R^9$ also can be hydrogen, amino, alkenyl, alkylamino, dialkylamino, arylamino or furyl; $R^3$ and $R^4$ are each selected from hydrogen; cycloalkyl; cycloalkyl substituted with one or two groups selected from alkyl, $-OH$, alkoxy, halogen and hydroxy substituted alkyl; phenyl or phenyl substituted with alkyl, alkoxy, halogen, alkanoylamino, cyano or alkoxycarbonyl; straight or branched alkenyl of 2-6 carbons; and straight or branched alkyl; wherein the alkyl groups of $R^1$, $R^2$, $R^3$ and $R^4$ may be substituted with 1-3 of the following: hydroxy; halogen; cyano; amino; alkoxy; alkoxyalkoxy; hydroxyalkoxy; succinimido; glutarimido; phenylcarbamoyloxy; phthalimido; phthalimidino; 2-pyrrolidono; cyclohexyl; phenoxy; phenyl or phenyl substituted with alkyl, alkoxy, alkoxycarbonyl, halogen, alkanoylamino or cyano; alkanoylamino; sulfamoyl; alkylsulfamoyl; acrylamido; benzoylsulfonicimido; alkylsulfonamido; phenylsulfonamido; alkoxycarbonylamino; alkylcarbamoyloxy; alkoxycarbonyl; alkoxycarbonyloxy; alkenylcarbonylamino; groups of the formula

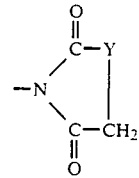

wherein Y is $-NH-$,

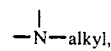

$-O-$, $-S-$, $>CHOH$, or $-CH_2O-$; $-S-R^{10}$ wherein $R^{10}$ is alkyl, phenyl, phenyl substituted with halogen, alkyl, alkoxy, alkanoylamino, cyano or alkoxycarbonyl, pyridyl, pyrimidinyl, benzoxazolyl, benzimidazolyl, benzothiazolyl or

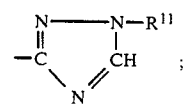

$-SO_2R^9$; $-COOR^9$; $-OXR^9$; $-NH-X-R^9$; $-CONR^{11}R^{11}$; $-SO_2NR^{11}R^{11}$; wherein $R^9$ and X are as defined above and $R^{11}$ is selected from H and $R^9$; alkoxy substituted with hydroxy, cyano, alkanoyloxy or alkoxy substituted with hydroxy, cyano, alkanoyloxy or alkoxy; phenoxy; phenoxy substituted with 1-3 of alkyl, alkoxy or halogen; or $R^3$ and $R^4$ combined forms pentamethylene, ethyleneoxyethylene or ethylenesulfonylethylene which, with the nitrogen atom to which it is attached, forms a ring; and $R^5$, $R^6$, $R^7$, and $R^8$ are each selected from hydrogen and alkyl; and wherein each of the above alkyl, alkylene, alkoxy, alkanoyl, and such hydrocarbon moieties contain 1-6 carbons.

A preferred group of compounds of this invention have the formula

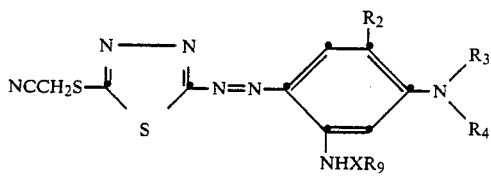

wherein $R_2$ is H or alkyl; $R_3$ and $R_4$ are selected from hydrogen, alkyl, cycloalkyl and alkyl substituted with aryl, acyloxy, cyano, carbamoyl, sulfamoyl, alkylamino, phenylcarbamoyloxy, alkoxy, aryloxy, alkoxycarbonyl, succinimido or phthalimido; X is CO, COO or $SO_2$; and $R^9$ is as defined above.

The present dyes exhibit improvements in one or more properties such as fastness to light, sublimation, chlorine, heat, ozone, gas, perspiration, crock, and wash, build, pH stability, bloom resistance, depth of shade, leveling, strike rate, energy of dyeing, migration, and the like, over such dyes as disclosed in U.S. Pat. Nos. 3,639,384; 3,639,385; 3,738,802; 3,762,861; 3,453,556; 3,657,215; and 3,657,215.

The invention can be better appreciated by reference to the following examples:

EXAMPLE 1

Preparation of 2-amino-5-cyanomethyl-1,3,4-thiadiazole

A mixture of 2-amino-5-mercapto-1,3,4-thiadiazole (66.5 g, 0.50 mol.), and ethanol (500 ml) is heated to reflux and chloroacetonitrile (41.1 g, 0.55 mol.) is added dropwise at reflux. Heating is continued for four hours and then about 400 ml of distillate is removed using a Dean-Stark trap. The clear solution is cooled to about 75° C. and water (150 ml) is added, allowing the temperature to drop to about 50° C. After adjusting the pH to about seven by adding slowly a solution of $Na_2CO_3$, the mixture is cooled to room temperature and the gray product is collected by filtration and washed with water. The moist filter cake is recrystallized from 300 ml of ethanol to yield the desired product which melts at 163°–164° C.

EXAMPLES 2–11

Diazotization and Coupling

To sulfuric acid (25 ml) is added sodium nitrite (3.6 g) portionwise with stirring, allowing the temperature to rise. The pale yellow solution is cooled and 100 ml of 1:5 acid (1 part propionic:5 parts acetic acid) are added below 15° C. To the chilled mixture is added portionwise 2-amino-5-cyanomethylthio-1,3,4-thiadiazole (8.6 g, 0.05 mol.) at 0°–5° C. After being stirred for 1.5 hours at 0°–5° C., the diazotization reaction mixture (0.005 mol. aliquot) is added to a chilled solution of each of the following couplers, prepared by dissolving 0.005 mol. of the coupler in 20 ml of 1:5 acid.

Example 2—3-Acetamido-N,N-diethylaniline
Example 3—3-Acetamido-N,N-di-n-propylaniline
Example 4—3-Acetamido-N-benzyl-N-ethylaniline
Example 5—3-Benzamido-N,N-di-n-propylaniline
Example 6—5-Acetamido-N-ethyl-2-methylaniline
Example 7—5-Acetamido-N-cyclohexyl-2-methylaniline
Example 8—3-Acetamido-N,N-dibenzylaniline
Example 9—50/50 Mixture of couplers of Examples 2 and 3
Example 10—7-Acetamido-N-ethyl-1,2,3,4-tetrahydro-2,2,4-trimethylquinoline
Example 11—N,N-Diethyl-3-methanesulfonamidoaniline Ammonium acetate is added to the cold coupling mixtures until the mineral acid is neutralized (Congo Red test paper). After allowing to stand one hour, water is added to the coupling mixtures to precipitate the dyes, which are collected by filtration, washed with water, and dried in air. Any dyes which are not filterable solids are washed by decantation and dried in air. All of the dyes are crystallized from hot methanol for purification. The dyes color textured polyester bright red shades. For example, the dye of Example 1 has a visible absorption maximum ($\lambda$max) at 525 nm.

The following tables give additional exemplary dyes of the present invention.

TABLE I

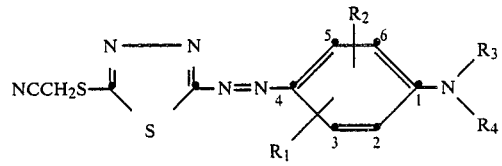

| Ex. No. | $R_1$, $R_2$ | $R_3$ | $R_4$ |
|---|---|---|---|
| 12 | H | $C_2H_5$ | $C_2H_5$ |
| 13 | 3-$CH_3$ | " | " |
| 14 | 3-Cl | " | " |
| 15 | 2-$OCH_3$—5-Cl | H | " |
| 16 | 2-$OCH_3$—5-$CH_3$ | " | " |
| 17 | 2,5-di-$OCH_3$ | " | " |
| 18 | 2,5-di-$CH_3$ | " | " |
| 19 | 2,5-di-Cl | " | " |
| 20 | 2-$SCH_3$ | " | " |
| 21 | 3-$OC_6H_5$ | $C_2H_5$ | " |
| 22 | 3-$SC_6H_5$ | " | " |
| 23 | 3-Br | " | " |
| 24 | 3,5-di-$NHCOCH_3$ | " | " |
| 25 | 3,5-di-$CH_3$ | " | " |
| 26 | 3-$NHCOCH_3$ | $C_2H_4OC_2H_5$ | $C_2H_4OC_2H_5$ |
| 27 | 3-$NHCOCH(CH_3)_2$ | $C_2H_5$ | $C_3H_7$—n |
| 28 | 3-$NHCOC_4H_9$—n | $CH_3$ | $CH_3$ |
| 29 | 3-$NHCOCH_2Cl$ | " | " |
| 30 | 3-$NHCOCH_2OCH_3$ | $CH_2C_6H_5$ | $C_2H_5$ |
| 31 | 3-$NHCOCH_2OC_6H_5$ | $CH_2CH_2OCOCH_3$ | $CH_2CH_2OCOCH_3$ |
| 32 | 3-$NHCOCH_2C_6H_5$ | $CH_2CH_2CN$ | $C_2H_5$ |
| 33 | 3-$NHCONHC_2H_5$ | $CH_2CH_2CONH_2$ | " |
| 34 | 3-$NHCOC_2H_5$ | $CH_2CH_2C_6H_5$ | $CH_2CH_2C_6H_5$ |
| 35 | 3-$NHCOC_6H_{11}$ | $CH_2CH_2CH_2CH_2OCOCH_3$ | $CH_2CH_2CH_2CH_2OCOCH_3$ |
| 36 | 3-$NHCOC_6H_4$—p-$OCH_3$ | $C_2H_5$ | $C_2H_5$ |
| 37 | 3-$NHCOCH_2CN$ | " | " |
| 38 | 3-$NHCOCH_2CH_2OCOCH_3$ | " | " |
| 39 | 3-$NHCOCH_2SCH_3$ | " | " |
| 40 | 3-NHCHO | " | " |
| 41 | 3-$NHSO_2C_6H_5$ | " | " |
| 42 | 2-$CH_3$—5-$NHSO_2CH_3$ | $C_6H_{11}$ | H |
| 43 | 2-$CH_3$—5-$NHCOCH_3$ | $CH(CH_3)C_2H_5$ | " |

TABLE I-continued

Structure: NCCH₂S-[thiadiazole]-N=N-[benzene ring with positions 1-6, R₁ at 3, R₂ at 5, NR₃R₄ at 1]

| Ex. No. | R₁, R₂ | R₃ | R₄ |
|---|---|---|---|
| 44 | 3-NHCO-(furan-2-yl) | C₂H₅ | C₂H₅ |
| 45 | 3-NHCONH₂ | " | " |
| 46 | 3-CH₃ | CH₂CH₂CN | " |
| 47 | " | CH₂CH₂OCOC₆H₅ | " |
| 48 | " | CH₂CH₂OCONHC₂H₅ | " |
| 49 | " | CH₂CH₂OCONHC₆H₅ | " |
| 50 | " | CH₂CH₂OCOC₆H₄—p-CH₃ | " |
| 51 | " | CH₂CH₂OH | CH₂C₆H₅ |
| 52 | " | CH₂CH(CH₃)—OH | C₆H₁₁ |
| 53 | " | CH₂CH₂OC₆H₅ | C₂H₅ |
| 54 | " | CH₂CH₂OCH₂CH₂OC₂H₅ | " |
| 55 | " | CH₂CH₂N(COCH₂)(COCH₂) [succinimide] | " |
| 56 | " | CH₂CH(OH)CH₂Cl | " |
| 57 | " | CH₂CH₂NHCOCH₃ | " |
| 58 | " | CH₂CH₂N-phthalimide (CO/CO-benzene) | " |
| 59 | " | CH₂CH₂N-(CO/SO₂-benzene) [saccharin-type] | " |
| 60 | " | CH₂CH₂N(SO₂CH₃)(CH₂CH₂CN) | " |
| 61 | " | CH₂CH₂N(CONH)(COCH₂) [hydantoin-type] | " |
| 62 | " | CH₂CH₂N(COS)(COCH₂) | " |
| 63 | 3-NHCOCH₃ | CH₂CH₂N(CO—CH₂)(CH₂—CH₂) [pyrrolidinone] | " |

TABLE I-continued

[Structure: NCCH2S-C(=S)-(thiadiazole N-N)-N=N-(benzene ring with R1 at position 3, R2 at positions 5/6, NR3R4 at position 1)]

| Ex. No. | R₁, R₂ | R₃ | R₄ |
|---|---|---|---|
| 64 | " | CH₂CH₂N(CO-benzene-CH₂) [isoindolinone group] | " |
| 65 | " | CH₂CH₂NHCOC₆H₅ | " |
| 66 | " | CH₂CH₂OC(=O)-C₆H₄-C(=O)OCH₃ | " |
| 67 | " | CH₂-C₆H₄-CO₂CH₃ | " |
| 68 | " | CH₂CH₂SO₂NH₂ | " |
| 69 | " | CH₂CH₂SO₂N(C₂H₅)₂ | " |
| 70 | " | CH₂CH₂SO₂NHC₂H₄OH | " |
| 71 | " | CH₂CH₂SO₂CH₃ | " |
| 72 | " | CH₂CH₂SCH₃ | " |
| 73 | " | CH₂CH₂SC₆H₅ | " |
| 74 | " | CH₂CH₂OCOC₆H₅ | " |
| 75 | " | CH₂CH₂S-(1,2,4-triazole) | " |
| 76 | " | CH₂CH₂S-(benzothiazole) | " |
| 77 | " | CH₂CH₂CON(C₂H₅)₂ | " |
| 78 | " | CH₂CH₂CO₂C₂H₅ | " |
| 79 | " | CH(CH₃)CH₂CO₂C₂H₅ | " |
| 80 | " | CH₂CH₂NHCOCH=CH₂ | " |
| 81 | " | CH₂CH=CH₂ | CH₂CH=CH₂ |
| 82 | 3-CH₃ | CH₂CH₂CN | CH₂CH₂OCOCH₃ |
| 83 | " | " | CH₂CH₂OC₂H₅ |
| 84 | " | —CH₂CH₂SO₂CH₂CH₂— | |
| 85 | " | —CH₂CH₂OCH₂CH₂— | |
| 86 | " | CH₂CH₂OCOCH₃ | CH₂CH₂OCOCH₃ |
| 87 | 3-Cl | " | " |
| 88 | H | " | " |
| 89 | 3-NHCOCH₃ | CH₂C₆H₁₁ | C₂H₅ |
| 90 | " | CH₂CH₂NHCO₂C₂H₅ | " |
| 91 | " | CH₂CH₂NHCOCH₂OH | " |
| 92 | " | CH₂CH₂CN | " |
| 93 | 2-CH₃—5-NHCOCH₃ | CH₂CH₂CO₂CH₃ | " |
| 94 | " | CH₂CH₂CONH₂ | " |
| 95 | 3-CH₃ | CH₂CH₂N(CON(CH₃)-COCH₂) [hydantoin-type ring] | " |

TABLE 1-continued

Structure: NCCH₂S-C(=N-N=)-S... -N=N- benzene ring with positions 1-6, R₂ at 5, R₃ at position 1 (N-R₃/R₄), R₁ at 3

| Ex. No. | R₁, R₂ | R₃ | R₄ |
|---|---|---|---|
| 96 | " | CH₂CH₂N(COCH₂)₂O (morpholine-dione) | " |
| 97 | " | CH₂CH₂N(COCH₂)(COCH₂)CH₂ | " |
| 98 | " | C₆H₅ | C₂H₄OCOCH₃ |
| 99 | " | C₆H₁₁ | CH₂CH₂CN |
| 100 | " | CH₂C₆H₅ | CH₂CH₂CN |
| 101 | " | " | CH₂CH₂OCOCH₃ |
| 102 | " | C₆H₁₁ | CH₂CH₂OCOCH₃ |
| 103 | " | CH₂CH₂CN | CH₂CH₂OCH₂CH₂OC₂H₅ |
| 104 | " | " | CH₂CH₂CN |
| 105 | 3-NHCOCH₃ | CH(CH₃)C₂H₅ | H |
| 106 | " | CH₂CH₂OCOCH₃ | C₂H₅ |
| 107 | 3-CH₃ | CH₂C₆H₅ | " |

TABLE 2

Structure: NCCH₂S-thiazole-N=N- naphthalene (positions 1-8) with R₂ at 5, R₇ at 4, R₆ at 3, R₅ at 2, N(N₁)(R₃) at 1, R₁ at 8, attached at position 6

| Ex. No. | R₁, R₂, R₅, R₆, R₇ | R₃ |
|---|---|---|
| 108 | H | C₂H₅ |
| 109 | " | CH₂C₆H₅ |
| 110 | 7-CH₃ | CH₂CH₂CH₃ |
| 111 | 2-CH₃ | CH₂C₆H₄—p-COOCH₃ |
| 112 | 2-CH₃—7-Cl | C₂H₅ |
| 113 | 5-CH₃—8-OCH₃ | " |
| 114 | 7-NHCOCH₃ | " |
| 115 | 2-CH₃—7-NHCOCH₃ | " |
| 116 | 2-CH₃—7-OC₂H₅ | " |
| 117 | 2-CH₃—7-NHCOC₂H₅ | CH₂CH₂OCOCH₃ |
| 118 | 2-CH₃—7-NHCOCH(CH₃)₂ | CH₂CH₂CN |
| 119 | 2,2,4-tri-CH₃—7-NHCOCH₂CH₃ | " |
| 120 | " | C₂H₅ |
| 121 | " | CH₂CH₂OCH₂CH₂OC₂H₅ |
| 122 | 2,7-di-CH₃ | CH₂C₆H₅ |
| 123 | " | CH₂CH₂OCOC₆H₅ |
| 124 | " | CH₂CH₂OCONHC₆H₅ |
| 125 | " | CH₂CH₂OCONHC₂H₅ |
| 126 | " | CH₂CH₂OC₆H₅ |
| 127 | " | CH₂CH₂CH₂NHCOCH₃ |
| 128 | " | CH₂CH₂NHSO₂CH₃ |
| 129 | " | CH₂CH₂NHCOC₆H₅ |
| 130 | " | CH₂CH₂CH₂NHCOOC₂H₅ |
| 131 | " | CH₂CH₂NHCOC₆H₁₁ |
| 132 | " | CH₂CH₂CONH₂ |
| 133 | " | CH₂CH₂CO₂C₂H₅ |
| 134 | " | CH₂CH₂SCH₃ |

TABLE 2-continued

| Ex. No. | R₁, R₂, R₅, R₆, R₇ | R₃ |
|---|---|---|
| 135 | " | CH₂CH₂N(COCH₂)₂ |
| 136 | " | CH₂CH₂N(CO)₂C₆H₄ (phthalimide) |
| 137 | " | CH₂CH₂N(CO)(SO₂)C₆H₄ |
| 138 | " | CH₂CH₂N(CO-CH₂)(CO-NH) (hydantoin) |
| 139 | " | CH₂CH₂CH₂N(CO-CH₂)(CH₂-CH₂) |
| 140 | " | CH₂CH₂N(CH₃)SO₂CH₃ |

TABLE 2-continued

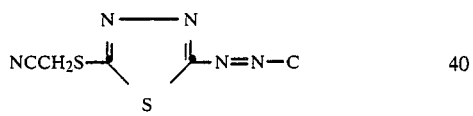

| Ex. No. | R₁, R₂, R₅, R₆, R₇ | R₃ |
|---|---|---|
| 141 | 2,2,4-tri-CH₃ | CH₂CH₃ |
| 142 | " | CH₂C₆H₅ |
| 143 | 2,2,4,7-tetra-CH₃ | CH₂CH₃ |
| 144 | " | CH₂CH₂OCOCH₃ |
| 145 | " | CH₂CH₂OCONHC₆H₅ |
| 146 | " | CH₂CH₂OCOCH₂OCH₃ |
| 147 | " | CH₂CH₂OCOC₆H₅ |
| 148 | " | CH₂C₆H₄—p-COOCH₃ |
| 149 | " | CH₂C₆H₁₁ |
| 150 | 2,7-di-CH₃ | CH₂CH₂SO₂NH₂ |
| 151 | " | CH₂CH₂SO₂NHC₂H₄OH |
| 152 | " | CH₂CH₂CH₂SO₂CH₃ |
| 153 | 2,2,4-tri-CH₃—7-NHSO₂CH₃ | CH₂CH₃ |
| 154 | 2,2,4-tri-CH₃—7-NHCHO | " |
| 155 | 2,2,4-tri-CH₃—7-NHCONHC₂H₅ | " |
| 156 | 2,2,4-tri-CH₃—7-NHCOC₆H₅ | " |
| 157 | 2,2,4-tri-CH₃—7-NHCOC₆H₁₁ | " |
| 158 | 2,2,4-tri-CH₃—7-NHCOCH₂CN | " |

The invention has been described in detail with particular reference to preferred embodiments thereof, but it will be understood that variations and modifications can be effected within the spirit and scope of the invention.

We claim:
1. A compound of the formula

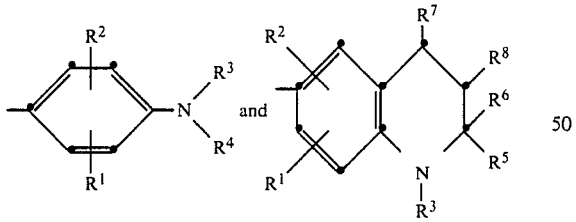

wherein C is a coupling component selected from

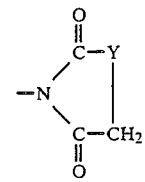

wherein
R¹ and R² are each selected from hydrogen, fluorine, chlorine, bromine, alkyl, cycloalkyl, alkoxy, phenoxy, alkylthio, arylthio, and radicals having the formula —NH—X—R⁹ in which X is —CO— or —COO—, and R⁹ is selected from alkyl, aryl, cycloalkyl and alkyl substituted with halogen, hydroxy, phenoxy, aryl, cyano, cycloalkyl, alkylsulfonyl, alkylthio, alkanoyloxy, and alkoxy, and when X is —CO—, R⁹ is further selected from hydrogen, amino, alkenyl, alkylamino, dialkylamino, arylamino and furyl;
R³ and R⁴ are each selected from hydrogen; cycloalkyl; cycloalkyl substituted with one or two groups selected from alkyl, —OH, alkoxy, halogen and hydroxy substituted alkyl; phenyl or phenyl substituted with alkyl, alkoxy, halogen, alkanoylamino, cyano or alkoxycarbonyl; straight or branched alkenyl of 2–6 carbons; and straight or branched alkyl; or R³ and R⁴ combined forms pentamethylene, ethyleneoxyethylene or ethylenesulfonylethylene which, with the nitrogen atom to which it is attached, forms a ring;

wherein the alkyl groups of R¹, R², R³ and R⁴ are unsubstituted or substituted with 1–3 of the following: hydroxy; halogen; cyano; amino; alkoxy; alkoxyalkoxy; hydroxyalkoxy; succinimido; glutarimido; phenylcarbamoyloxy; phthalimidino; 2-pyrrolidono; cyclohexyl; phenoxy; phenyl or phenyl substituted with alkyl, alkoxy, alkoxycarbonyl, halogen, alkanoylamino or cyano; alkanoylamino; sulfamoyl; alkylsulfamoyl; acrylamido; phthalimido; benzoylsulfonicimido; alkylsulfonamido; phenylsulfonamido; alkoxycarbonylamino; alkylcarbamoyloxy; alkoxycarbonyl; alkoxycarbonyloxy; alkenylcarbonylamino; groups of the formula

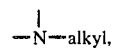

wherein Y is —NH—,

—N—alkyl,

—O—, —S—, >CHOH, or —CH₂O—; —S—R¹⁰ wherein R¹⁰ is alkyl, phenyl, phenyl substituted with halogen, alkyl, alkoxy, alkanoylamino, cyano or alkoxycarbonyl, pyridyl, pyrimidinyl, benzoxazolyl, benzimidazolyl, benzothiazolyl, or a radical of the formula

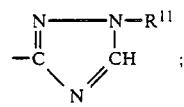

—SO₂R⁹; —COOR⁹; —OXR⁹; —NH—X—R⁹; —CONR¹¹R¹¹; —SO₂NR¹¹R¹¹; wherein R⁹ and X are as defined above and R¹¹ is selected from H and R⁹; alkoxy substituted with hydroxy, cyano, alkanoyloxy or alkoxy; phenoxy; phenoxy substituted with 1–3 of alkyl, alkoxy or halogen; and R⁵, R⁶, R⁷, and R⁸ are each selected from hydrogen and alkyl.

2. A compound according to claim 1 wherein C is

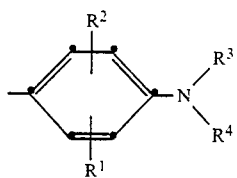

and $R^1$, $R^2$, $R^3$, and $R^4$ are as defined therein.

3. A compound according to claim 1 wherein C is

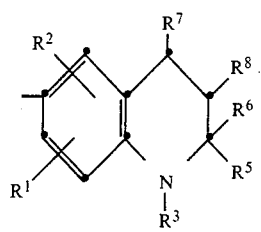

and $R^1$, $R^2$, $R^3$, $R^5$, $R^6$, $R^7$ and $R^8$ are as defined therein.

4. A compound according to claim 1 having the formula

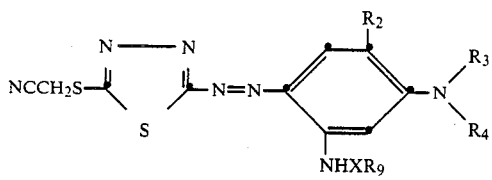

wherein $R_2$ is H or alkyl; $R_3$ and $R_4$ are selected from hydrogen, alkyl, cycloalkyl and alkyl substituted with aryl, —$OXR^9$, cyano, carbamoyl, sulfamoyl, alkylamino, phenylcarbamoyloxy, alkoxy, aryloxy, alkoxycarbonyl, succinimido or phthalimido; X is —CO— or —COO—; and $R^9$ is as defined in claim 1.

5. The compound of claim 1 having the formula

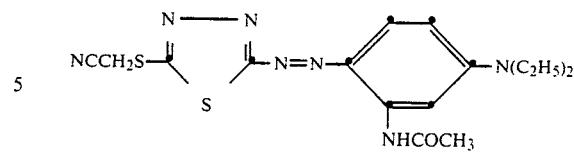

6. The compound of claim 1 having the formula

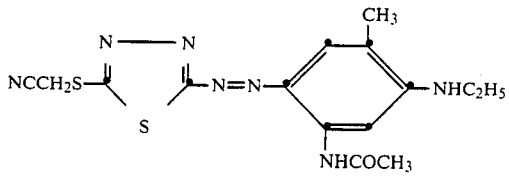

7. The compound of claim 1 having the formula

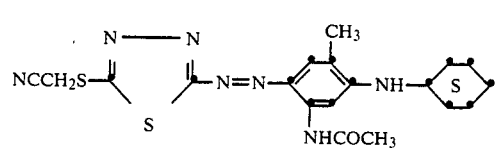

8. The compound of claim 1 having the formula

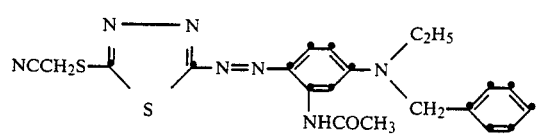

9. The compound of claim 1 having the formula

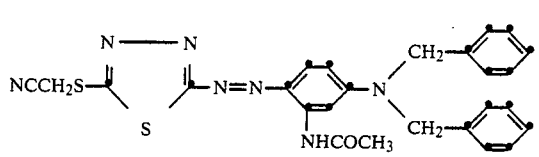

10. The compound of claim 1 having the formula

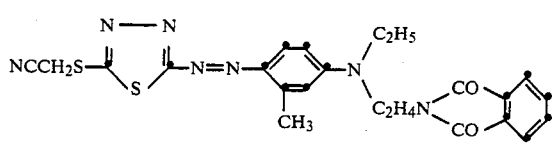

* * * * *